United States Patent [19]
Larsen

[11] 3,929,384
[45] Dec. 30, 1975

[54] EMPTY AND LOAD BRAKE APPARATUS

[75] Inventor: Glen D. Larsen, Upper Marlboro, Md.

[73] Assignee: Southern Railway Company, Washington, D.C.

[22] Filed: Oct. 9, 1974

[21] Appl. No.: 513,463

[52] U.S. Cl. ............................................. 303/22 R
[51] Int. Cl.² .......................................... B60T 8/20
[58] Field of Search.... 303/22 A, 22 R, 23 A, 23 R; 188/195

[56] References Cited
UNITED STATES PATENTS

| | | | |
|---|---|---|---|
| 808,703 | 1/1906 | Turner | 303/23 R X |
| 2,362,931 | 11/1944 | Rodway | 303/23 R |
| 2,991,801 | 7/1961 | Larsson | 303/23 R X |

*Primary Examiner*—Duane A. Reger
*Attorney, Agent, or Firm*—Watson, Cole, Grindle & Watson

[57] ABSTRACT

Empty and load brake apparatus for a railway car having sprung and unsprung members includes a variable capacity brake valve connected to the brake cylinder, the brake valve including a poppet valve urged into a closing position by means of a spring, the spring tension of which is varied depending on the relative positions of the sprung and unsprung members so as to limit the fluid pressure established in the brake cylinder to a predetermined minimum during a empty car condition, and to increase the fluid pressure at a variable rate during a loaded car condition.

2 Claims, 3 Drawing Figures

EMPTY AND LOAD BRAKE APPARATUS

This invention relates generally to an empty and load brake apparatus, and more particularly to such an apparatus designed to limit the brake cylinder pressure of a standard railway car brake to a predetermined value when the car is empty and to increase the pressure at a variable rate when the car is loaded.

Heretofore, empty and load brake devices have been devised of the type including a load sensor valve, a load proportional valve and an equalizing volume reservoir. The load sensor valve measures the relationship of the car body to the top of the truck side frame to determine if the car is empty or loaded. If the car is loaded, travel of a sensor arm of this valve will be limited and the internal porting thereof will not change. Brake cylinder pressure therefore flows uninterrupted to the brake cylinder. During an empty car condition movement of the sensor arm permits the valving to move sufficiently to connect the brake cylinder volume to the equalizing volume reservoir as well as to the load proportional valve. A diaphragm in this proportional valve is designed in such a manner as to effect a brake cylinder pressure which is less than that applied to a loaded car for any brake pipe reduction over a minimum service application. In other words, adding the reservoir capacity to the brake cylinder volumes insures that the brake cylinder pressure will not exceed a certain amount on its service application regardless of brake pipe reduction during an empty load condition. The proper reservoir size must be selected in order to adequately limit the maximum obtainable air pressure in either a service or emergency application. The reservoir also serves to limit the increase of pressure from service to emergency to not more than a certain percentage.

It has now been found that the air pressure from the brake cylinder in excess of a predetermined minimum brake cylinder pressure may be vented directly to atmosphere during an empty load braking operation. The load proportional valve and reservoir earlier referred to can therefore be completely eliminated and the sensor valve substituted by the present invention which has as its objective the provision of a variable capacity brake valve which determines the relative positions of the sprung and unsprung members in a manner similar to the load sensor valve described earlier except that the fluid pressure established in the brake cylinder is limited by the variable capacity brake valve itself to a predetermined minimum during an empty car condition, and the spring tension of a spring means is varied so as to increase the fluid pressure at a variable rate during a loaded car condition.

In U.S. Pat. No. 3,338,640 to Walter B. Kirk, an empty and load brake apparatus for railway rolling stock is disclosed as making use of a so-called strut cylinder connected to the brake cylinder, with a vent port in the strut cylinder being uncovered during an empty load condition so as to limit the brake pressure to a predetermined maximum. A spring-biased strut within the cylinder engages a portion of the truck bolster when moved in a direction perpendicular thereto during a loaded car condition. The vent port thereby remains covered so that maximum braking pressure may be applied by the brake cylinder. Such an arrangement has been found disadvantageous since it does not allow for application of a variable brake pressure between a partially loaded and a fully loaded car condition.

It is therefore another object of the present invention to provide an empty and load brake apparatus as having a variable capacity brake valve in communication with the standard brake cylinder, such a brake valve having a poppet valve therein movable between an open and closed position against the force of a spring which permits the poppet valve to open for venting fluid through a port of the variable capacity valve in response to fluid pressure established in the brake cylinder which exceeds a predetermined value depending on the load on the car. Means controlled by the relative position of the sprung and unsprung members of the car is provided for varying the tension in the spring depending on the load so as to limit the fluid pressure of the brake cylinder to a predetermined minimum during an empty car condition and to increase the fluid pressure at a variable rate during a loaded car condition.

Another object is to provide such an apparatus wherein a slidably movable feeler element extends outwardly of the valve cylinder of the variable capacity valve and a plunger is also movable within the valve cylinder and bears against the spring. Another spring bears against the plunger and maintains the feeler element in its outwardly extended position, the feeler element being out of contact with a surface of the unsprung part of the car during an empty car condition and being in contact therewith during a loaded car condition, whereby the fluid pressure established in the brake cylinder is limited to a predetermined minimum during the empty car condition and is increased at a variable rate in accordance with an increased loaded car condition as the tension in the first-mentioned spring is variably increased during inward movement of the feeler element.

A further object of this invention is to provide such an apparatus wherein damping means are provided for the plunger for dampening the movement thereof to avoid the effects of car body rocking and bouncing on the valve during operation.

Other objects, advantages and novel features of the invention will become more apparent from the following detailed description of the invention when taken in conjunction with the accompanying drawings wherein:

FIG. 3 is a side view of the mounting means for the brake valve taken along line 3—3 of FIG. 2.

Figure 1:
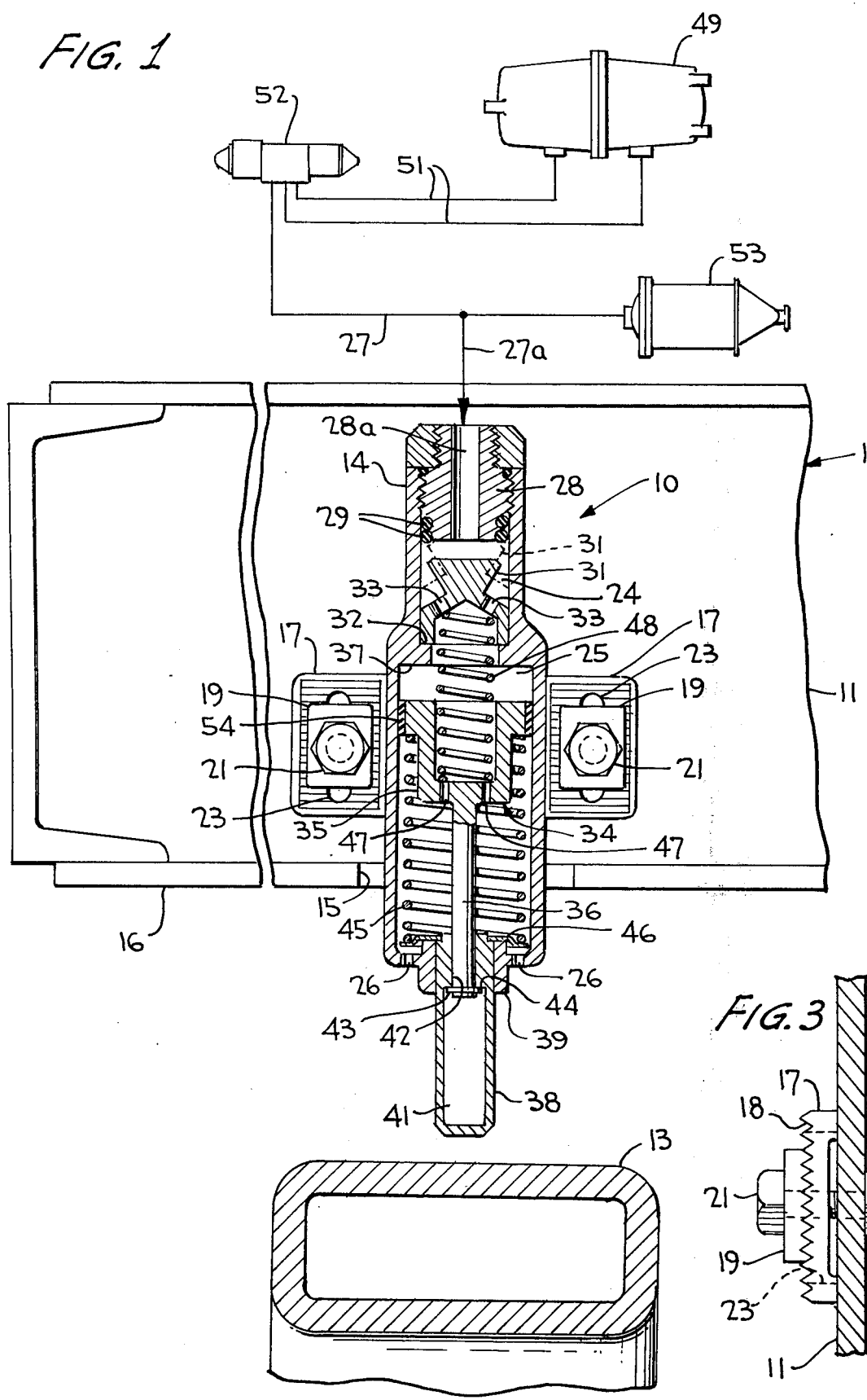
FIG. 1 is a fragmental elevational view partly in section showing the apparatus in accordance with the invention for an empty car condition.

Turning now to the drawings wherein like reference characters refer to like and corresponding parts throughout the several views, the variable capacity brake valve 10 as part of the empty and load brake apparatus is mounted on a structural web 11 of a car body bolster 12. A portion of a truck side frame 13 is shown in its relation to the car body bolster in FIGS. 1 and 2. This is a typical installation for an empty and loaded freight brake equipment wherein the load sensor valve referred to above is similarly mounted for measuring the relationship of the car body to the top of the truck side frame to determine if a car is empty or loaded. It should be understood that car body bolster 12 is supported by coil springs (not shown) at opposite ends thereof on the unsprung truck side frames 13, in the normal well-known manner, such that the bolster will be lowered downwardly toward the truck side frame and the railway tracks during compression of the coil springs when the car is loaded. Obviously, the degree of downward movement of the bolster depends on the degree of loading of the car.

Variable capacity brake valve 10 comprises a valve cylinder 14 located directly above a top surface of the truck side frame, cylinder 14 extending through an opening 15 provided in a cover plate or flange 16 of the car body bolster. Cylinder 14 is provided with outwardly extending flanges 17 each having a serrated or roughened outer surface 18 as shown in FIG. 3. A washer 19 or the like also having a serrated or roughened surface cooperates with the roughened surfaces of the flanges, and a bolt 21 extends through axially aligned openings in elements 11, 17 and 19 for cooperation with a nut 22 on the far side of web 11. An elongated opening 23 is provided in each flange 17 in a vertical direction to permit the brake valve to be adjusted upwardly and downwardly with respect to side frame 13 upon a shifting of flanges 17 relative to washers 19.

Cylinder 14 of the brake valve has a bore 24 in communication with a slightly larger diameter bore 25, with openings 26 being provided in the wall of bore 25 opening to the atmosphere. Bore 24 is in communication with a brake cylinder line 27 via air line 27a, shown schematically at the top of FIGS. 1 and 2, through a passageway 28a formed in an open valve seat member 28 threadedly or otherwise secured in place at the upper end of cylinder 14. Elastomeric seal rings 29 are disposed between the valve seat member and the inner wall of bore 24 to provide an adequate seal at this location.

A poppet valve 31 is disposed for sliding movement within bore 24 between valve seat member 28 and a shoulder 32 acting as a stop. Openings 33 are provided in the poppet valve to provide a fluid passage between bore 25 and passageway 28a of the valve seat member when the poppet valve is in its position shown in FIG. 1 during a condition to be hereinafter described.

Figure 2:
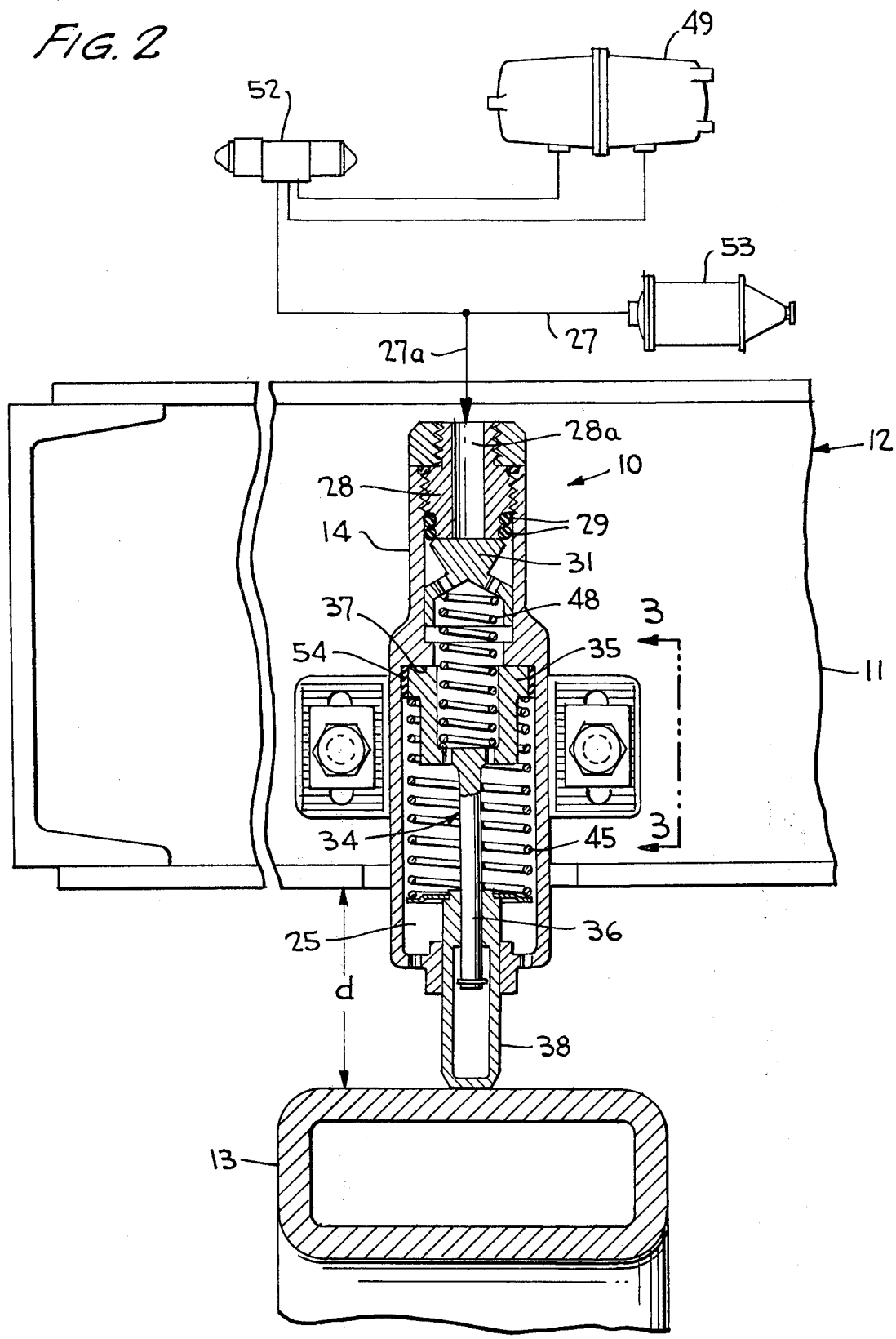
FIG. 2 is a view similar to FIG. 1 except that the apparatus is shown for a loaded car condition.

A plunger 34, having a cup-shaped element 35 at its upper end and an integral stem 36 extending downwardly therefrom, is axially movable within and is guided by the inner wall of bore 25 between its positions shown in FIGS. 1 and 2. In it upper position of FIG. 2, the cup-shaped element is seated against a shoulder 37 during a condition to be hereinafter described.

A feeler element 38 is disposed for sliding axial movement within the embossed lower end 39 of cylinder 14. Stem 36 of the plunger extends into hollow bore 41 of the feeler element through an opening 42, a clip 43 being attached to the lower end of the stem and bearing against a shoulder 44 for retaining the feeler element in its position of FIG. 1. The plunger is resiliently urged toward its uppermost position of FIG. 1 by means of a coil spring 45 bearing against an underside portion of element 35 at one end, and bearing against a spring plate 46 at its other end. The spring plate is attached to the inner end of the feeler element and rests against the inner surface of embossed end 39.

Openings 47 are provided in cup-shaped element 35 for providing a fluid passage between opposite ends thereof. Also, a coil spring 48 is seated within cup-shaped element 35 at one end and bears against the underside of poppet valve 31 at its other end for maintaining the poppet valve in a closed condition fully seated against valve seat 28 as shown in phantom outline in FIG. 1.

Schematically shown in FIGS. 1 and 2 are a combined auxiliary and emergency reservoir 49 connected in the normal manner through lines 51 to an AB control valve 52. This control valve is connected to an AB brake cylinder 53 through brake cylinder line 27. Members 49, 52 and 53, their interconnections and their function are all standard equipment whose operation is well known in the art.

In operation, with no air pressure in brake cylinder line 27 from brake control valve 52, poppet valve 31 is fully seated against valve seat member 28 as shown in phantom outline in FIG. 1 and in solid outline in FIG. 2. During an empty car condition, the plunger is maintained in its position of FIG. 1 by means of coil spring 45, and the poppet valve is maintained in its closing position against the valve seat member by means of coil spring 48 having approximately a 30 lb. spring tension. The variable capacity brake valve 10 is mounted in place so that, during such an empty car condition, its feeler element 38 is spaced from the top surface of truck side frame 13 a small amount as shown in FIG. 1. When it is desired to effect a service brake application, control valve 52 is operated, by reduction of fluid under pressure in a brake pipe (not shown) which extends in a conventional manner the length of the car to cause fluid under pressure to be supplied from reservoir 49 by brake cylinder line 27 to each brake cylinder 53 on the car. Simultaneously, with the supply of fluid under pressure to the brake cylinders, fluid under pressure is supplied via line 27a into passage 28a of the valve seat member. For example, upon actuation of the air brakes in a service application from a 70 psi reservoir, brake line 27 to the brake cylinder will equalize at approximately 50 psi. Poppet valve spring 48 is fully extended since the car is empty and, when the 50 psi enters passage 28a, poppet valve 31 is thereby forced from its seat since spring 48 is a 30 lb. spring offering resistance to the incoming pressure only up to 30 psi. This incoming pressure is therefore vented to the atmosphere via openings 33, 47 and 26 until the pressure in line 27 drops to approximately 30 psi. The poppet valve will then close against the valve seat member under the action of coil spring 48, thereby limiting the fluid pressure effective in the brake cylinders to the appropriate degree, such as 30 psi, for braking an empty car and preventing the wheels from sliding thereby reducing the forces on the draft rigging between cars.

Referring now to FIG. 2 in describing operation of the brake valve for a loaded car condition, the weight of the load will be sufficient to move the car body downwardly toward side frame 13 as the car body coil springs are compressed. This downward movement of the car body moves valve 10 sufficiently near the top side of frame 13 as to cause feeler element 38 to be moved inwardly of valve cylinder 14. Spring 45 thereby urges the plunger upwardly so that its cup-shaped element 35 abuts against shoulder 37. This causes spring 48 to compress and poppet valve 31 is thereby maintained in its fully seated position against valve seat member 28 as shown in FIG. 2. When the air brakes have been activated in a service application from a 70 psi reservoir 49, brake line 27 to brake cylinders 53 will equalize at approximately 50 psi (60 psi in an emergency). This 50 psi enters passage 28a and confronts the closed poppet valve 31. The poppet valve is held against its seat by proportional spring 48 whose pressure ranges from 30 lbs. in its position shown in phantom in FIG. 1 to 60 lbs. in its compressed condition shown in FIG. 2. In other words, with spring 48 in its fully extended position of FIG. 1 with poppet valve in its fully seated position shown in phantom outline therein, the spring offers a 30 lb. resistance to pressure through passage 28a. On the other hand, spring 48 is in its fully compressed condition shown in FIG. 2 and therefore offers a maximum resistance of approximately 60 lbs. to fluid pressure through passage 28a. Of course, the spring pressure may vary between 30 and 60 lbs. depending on the loaded condition of the car wherein the distance $d$ shown in FIG. 2 between the car body bolster and the truck side frame is slightly greater than shown although still in a loaded condition with feeler element 38 in contact with the top of side frame 13. Moreover, the pressure range of spring 48 could be from 10 lbs. to 100 lbs. if compatible with the brake equipment operating range.

When the car is loaded, the car sprung body bolster 12 on which valve 10 is mounted approaches the unsprung truck side frame 13 causing feeler 38 to be compressed against spring 45. This spring causes plunger 34 to be forced upwardly so as to compress spring 48 thereby causing an increased pressure of poppet valve 31 on its seat 28 and seal 29. This pressure increases to a maximum if the car is fully loaded. Otherwise, this spring pressure assumes a position directly proportional to the load and causes the poppet valve to maintain such a proportional pressure in the brake cylinder thereby providing braking forces proportional to the loaded car. Obviously, then, for a maximum spring 48 pressure of 60 lbs. in a loaded car condition of FIG. 2, the fluid pressure in line 27a will be fully resisted by the compressed spring 48 so that none of the fluid pressure will be vented to atmosphere through openings 33, 47 and 26. Instead, all the fluid pressure in line 27a and line 27 will be available for braking the loaded car.

In accordance with another feature of the invention, friction means 54 is secured to cup-shaped element 35 of the plunger so as to bear against the inner wall of bore 25 during movement of the plunger between its positions of FIGS. 1 and 2. Such a friction means is designed for the purpose of effecting a time lag of the plunger during its movement to defeat the effects of car body rocking or bouncing on the brake valve during operation. Such a friction means may be an elastomeric material, although a hydraulic or viscous dampening arrangement could be devised to achieve the same purpose.

From the foregoing it can be seen that a brake valve has been devised as having a variable capacity for sensing an empty and loaded car condition to adjust the brake pressure accordingly. The valve is controlled by a spring whose pressure is directly proportional to the loaded car weight so that, for a fully loaded car, all the brake pressure is made available for braking and, for a less than fully loaded car, an amount of pressure is made available for braking in proportion to the loaded weight on the car. For an empty car condition, the brake pressure in excess of 30 psi is vented to the atmosphere so that the brake pressure is limited to 30 psi which is all that is necessary for braking in empty car conditions.

The damper means provided herein causes a time lag for movement of the plunger to thereby minimize the effect of rocking or bouncing of the car body bolster on the variable capacity brake valve. The unique "in-line" component offered by the variable capacity brake valve assures a positive shut-off of brake pressure and a high reliability. Moreover, the overlapping of springs 45 and 48 in the valve cylinder serves to conserve space of the brake valve and to thereby make it more compact.

Obviously, many modifications and variations are made possible in the light of the above teachings. It is therefore to be understood that within the scope of the appended claims the invention may be practiced otherwise than as specifically described.

What is claimed is:

1. Empty and load brake apparatus for a railway car having a sprung part including a bolster vertically deflectable to varying degrees relative to an unsprung part of said car in accordance with the load on said car, comprising, in combination:
   brake cylinder means operative for effecting a brake application when pressurized and a brake release when depressurized;
   a variable capacity brake valve for said brake cylinder means, comprising:
   a valve cylinder having a bore, said valve cylinder being mounted on said sprung part and communicating with said brake cylinder means;
   a valve seat member mounted within said bore, said valve seat member having a passageway through which pressurized air from said brake cylinder means communicates;
   a poppet valve slidably disposed in said bore for opening and closing said passageway as said poppet valve moves toward and away from said valve seat member;
   a first spring urging said poppet valve into a closing position against said valve seat member;
   a slidable movable feeler element extending outwardly of said valve cylinder;
   a plunger movable within said valve cylinder and bearing against said first spring;
   a second spring disposed between said plunger and said feeler element; and
   vent openings in said cylinder, said poppet valve and said plunger for venting fluid under pressure from said passageway during a braking operation and out through said valve cylinder upon predetermined movement of said poppet valve away from said valve seat into an open position responsive to fluid pressure established in said brake cylinder means which exceeds a predetermined value depending on the load on said car;
   said feeler element being movable in the same direction of deflection of said bolster into contact with a surface of said unsprung part during a loaded car condition and out of contact therewith during an empty car condition, whereby the fluid pressure established in said brake cylinder means is limited to a predetermined minimum during the empty car condition, and the fluid pressure is increased at a variable rate in accordance with an increased loaded car condition as the tension of said first spring is variably increased during inward movement of said feeler element.

2. The apparatus according to claim 1, wherein said feeler element is hollow at one end for the reception of said plunger at one end thereof, and said plunger is cup-shaped at its other end for the reception of said first spring, said second spring surrounding said first spring in the vicinity of said cup shaped other end, whereby the inward movement of said feeler element tensions said second spring and causes said plunger to likewise move inwardly to thereby tension said first spring.

* * * * *